Figure 1:
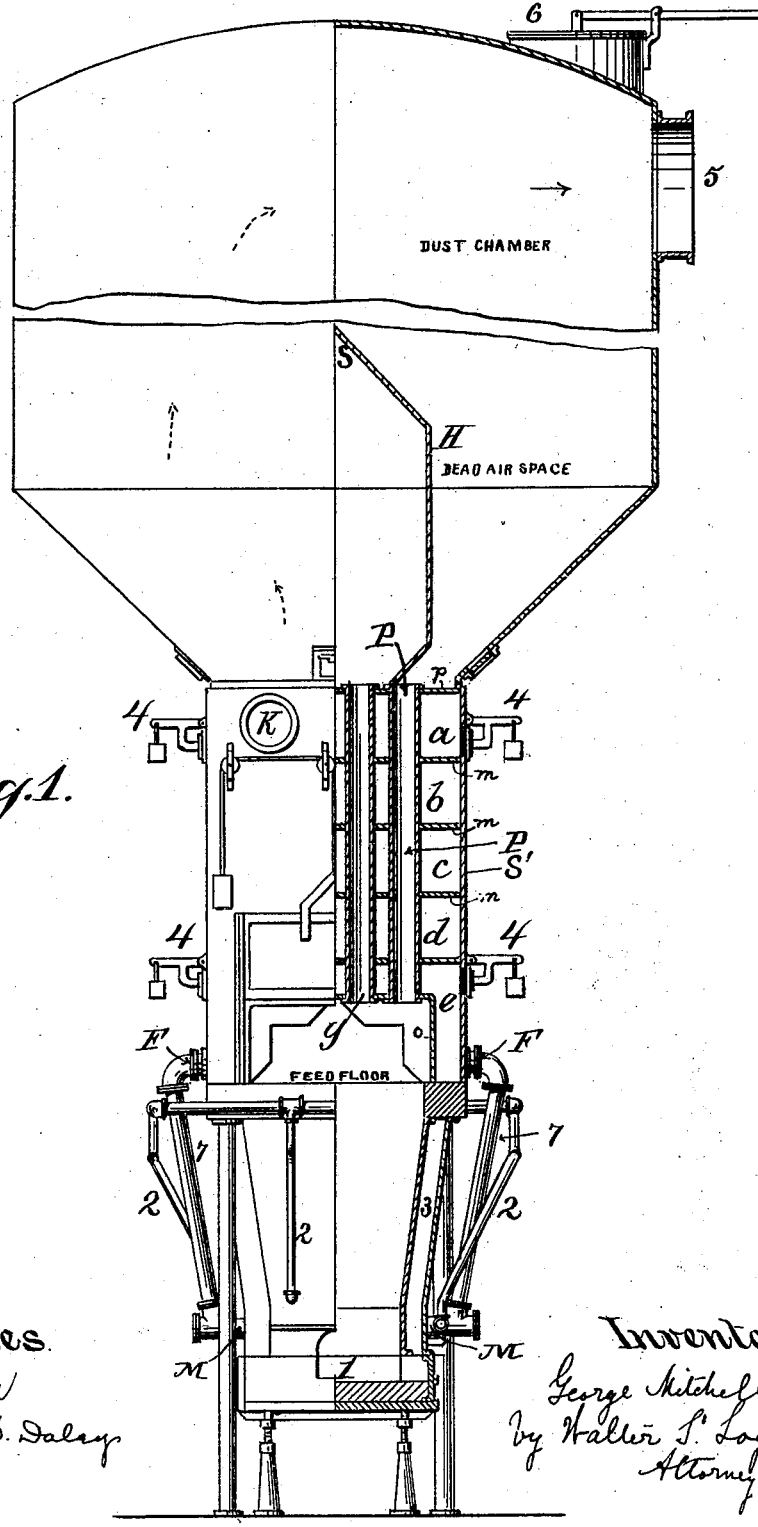

No. 691,648. Patented Jan. 21, 1902.
G. MITCHELL.
COPPER SMELTING FURNACE.
(Application filed Aug. 4, 1900.)

(No Model.) 2 Sheets—Sheet 1.

Witnesses
D. W. Gardner
Charles B. Daley

Inventor:
George Mitchell
by Walter S. Logan
Attorney

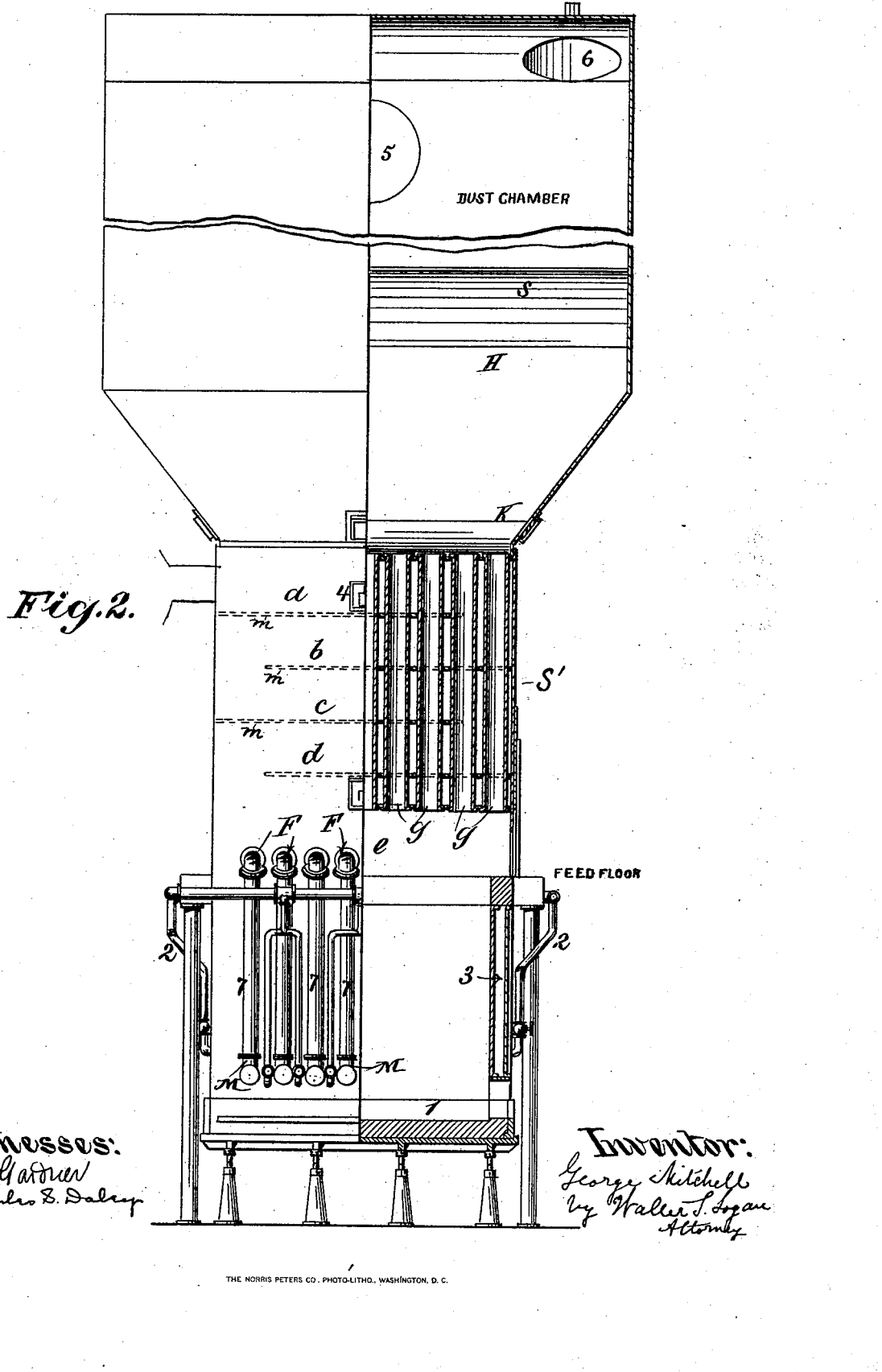

UNITED STATES PATENT OFFICE.

GEORGE MITCHELL, OF LOS ANGELES, CALIFORNIA.

COPPER-SMELTING FURNACE.

SPECIFICATION forming part of Letters Patent No. 691,648, dated January 21, 1902.

Application filed August 4, 1900. Serial No. 25,922. (No model.)

*To all whom it may concern:*

Be it known that I, GEORGE MITCHELL, a citizen of the United States, residing in the city of Los Angeles, State of California, have invented certain new and useful Improvements in Copper-Smelting Furnaces; and I do declare the following to be a full, clear, and exact description of my invention, such as will enable others skilled in the art to which it appertains to make and use the same, reference being had to the accompanying drawings, and to the letters and figures of reference marked thereon, which form a part of this specification.

My invention relates to an improvement in copper-smelting furnaces, the object of the invention being to utilize the heat of the escaping gases and unconsumed products of combustion generated and produced in the smelting of copper ores to heat the air that is supplied to the furnace through its series of twyers, and thereby reduce the amount of fuel that is required for the smelting operation, and, further, to utilize the incoming supply of air to maintain the walls of the furnace above the feed-opening at a sufficiently low temperature to render the use of fire-brick or other refractory furnace-lining unnecessary and permit of the use of a metallic furnace-section for conveying away the heated gases and unconsumed products of combustion.

In the accompanying drawings, Figure 1 represents an end elevation, partly in vertical section, of my improved furnace; and Fig. 2 represents a side elevation, partly in section.

The furnace-crucible 1 is preferably provided with a water-jacket 2, to which water is supplied by a series of pipes which are connected to a main water-supply pipe.

Upon the feed-floor of the furnace is mounted a metal chamber or upper section S', which is preferably rectangular in form and is provided with a series of horizontal metal plates or partitions $m$. Each one of these plates $m$ is secured at its sides and at one of its ends to the inner side walls and one of the end walls of the upper chamber or section of the furnace, an air-passage being formed between one end of the plate and the adjacent wall of the chamber, through which the air-supply may flow from one heating-chamber to the next adjacent heating-chamber of the series. The series of horizontal plates $m$, in conjunction with the walls of chamber S', form the series of air-chambers $a$, $b$, $c$, $d$, and $e$, which are connected in alternation with each other by end passages, whereby the air-blast entering the upper chamber $a$ is caused to flow in a zigzag or serpentine path downwardly through the several chambers until it reaches the lowermost chamber $e$. The air-blast is supplied by any suitable blower or compressor and enters through the inlet K, and the pressure in the different chambers or in different portions of the downward path of the air-supply is regulated by means of the safety-valves 4, which may be independently adjusted for such purpose.

A series of pipes 7, suitably arranged around the exterior walls of the crucible, are connected at their upper ends F with the lower air-chamber $e$, while their lower ends are connected with the twyers M, through which air is injected into the crucible.

Upon or over the feed-floor of the furnace is erected or mounted a partition or crown sheet $o$, to which are attached the lower and open ends of a series of vertical flues $g$, the upper and open ends of which are attached to the upper wall or end $p$ of the main chamber S'. The series of vertical flues pass through the several horizontal plates or partitions $m$ and the several air chambers or passages $a$, $b$, $c$, $d$, and $e$.

Upon top of the chamber S' may be placed a dust-chamber provided with a deflector H, having an inclined portion S, which serves to deflect the direction of the upward flow of gases, unconsumed products of combustion, and dust and cause them to flow in a horizontal direction to and out of the outlet 5. The object of thus deflecting the upward current and draft of gases and dust is to check the force of the upward draft and current and cause it to take a horizontal path and permit the heavier particles of dust to drop below the action of the current and into the bottom of the dust-chamber in rear of the deflector, from which the dust is returned to the furnace again through the flues P, situated at one end of chamber S' and out of the direct line of draft.

In the operation of smelting sulfid ores the gases and unconsumed products of combustion are carried upwardly through the series of vertically-arranged metal flues $g$, with the result that each one of such flues is heated, which produces a large area of heat-radiating surface within each one of the chambers $a$, $b$, $c$, $d$, and $e$ through which the series of flues pass. The air-blast entering the inlet K in its passage through the upper chamber or air-passage $a$ is heated not only by the heat radiated by the walls of the series of flues $g$, but also by its being caused to flow in direct contact with said walls in its passage from and through chamber $a$ into the next lower chamber $b$, wherein an additional amount of heat is stored in the air. Thus it will be noted that the heat stored in the air-supply is gradually increased in amount from the time it enters the inlet K until it enters the furnace through the series of twyers M, and thus the requisite temperature for smelting sulfid ores is obtained by the use of much less fuel than would be required if the outer and cold air should be supplied to the twyers.

Again, the employment of my improved smelting-furnace renders the use of fire-brick linings unnecessary, which in practice operates as a great saving of time, labor, and expense. The crucible is furnished with a water-jacketed lining, while the upper portion of the furnace is effectually shielded against damage due to heat by the air-blast supplied to the furnace. The incoming air-supply which traverses the series of chambers or passages $a$, $b$, $c$, $d$, and $e$ on its way to the twyers operates to abstract such an amount of heat from the metal walls comprising the partitions, flues, and side walls of the upper chamber as to prevent them from being destroyed or impaired by the action of the heat. This is a most important object and result, because in the use of smelting-furnaces requiring fire-brick linings at points remote from railroad transportation the loss of time and the expense and annoyance incurred in removing and repairing fire-brick linings are so great as to render it most desirable to dispense altogether with such construction of furnace.

Having fully described my invention, what I claim as new, and desire to secure by Letters Patent, is—

1. In a smelting-furnace, the combination with the crucible, a feed-floor, and a metal chamber or section located above the feed-floor of the furnace, of a series of transversely-arranged partitions forming a zigzag or serpentine passage for the air-blast, an air-blast inlet communicating with the upper end of such air-passage, air-pipes communicating at one end with the lower portion of the air passage or chamber, and their opposite ends with a series of twyers, and a series of vertical flues extending from the furnace upwardly through said partitions and air chambers or passages, substantially as set forth.

2. In a smelting-furnace, the combination with the crucible having a feed-floor and a feed-opening above the same and a metal chamber mounted on the feed-floor, of a series of horizontal metal partitions arranged to form a zigzag air-passage within said chamber, a series of vertically-arranged metal flues extending from the feed-opening upwardly through the metal chamber and through the several folds of the zigzag air-passage, an air-inlet communicating with the upper end of said air-passage, and pipes for conveying the heated air to the twyers, substantially as set forth.

In witness whereof I have hereunto set my hand this 27th day of July, 1900.

GEO. MITCHELL.

Witnesses:
CHARLES S. DALAY,
ARTHUR W. OPP.